R. YOUMANS.
AUTOMOBILE ATTACHMENT.
APPLICATION FILED JUNE 21, 1919.

1,335,631.

Patented Mar. 30, 1920.
2 SHEETS—SHEET 1.

WITNESS:
Geo. Ackman Jr.

INVENTOR.
BY Randolph Youmans
Victor J. Evans
ATTORNEY.

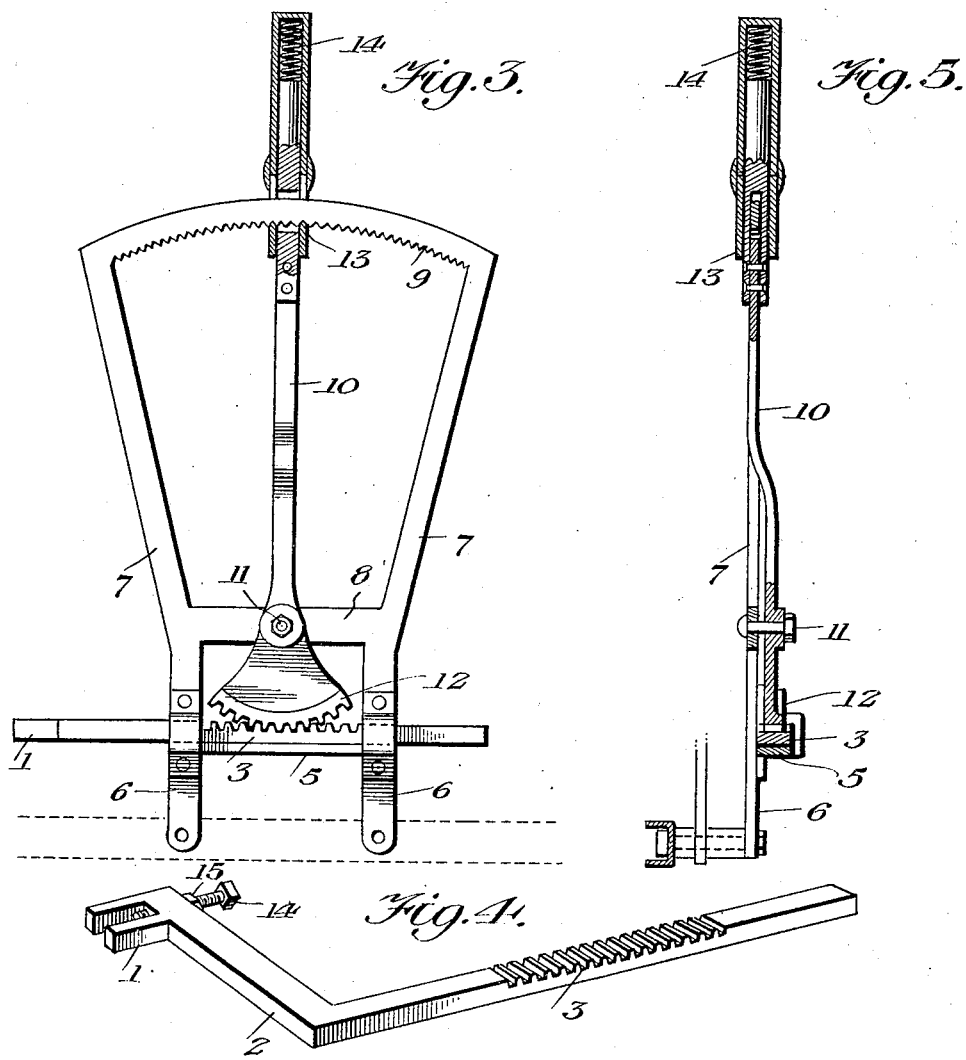

UNITED STATES PATENT OFFICE.

RANDOLPH YOUMANS, OF STONY POINT, NEW YORK.

AUTOMOBILE ATTACHMENT.

1,335,631.    Specification of Letters Patent.    Patented Mar. 30, 1920.

Application filed June 21, 1919. Serial No. 305,739.

*To all whom it may concern:*

Be it known that I, RANDOLPH YOUMANS, a citizen of the United States, residing at Stony Point, in the county of Rockland and State of New York, have invented new and useful Improvements in Automobile Attachments, of which the following is a specification.

The object of my invention is to provide simple and easily installed means whereby an automobile of the Ford type may be readily transformed into a lever-gear automobile, and this in such manner that the clutch or low speed member of the car may be moved forwardly or released at the will of the driver; the application of my improvement interfering in no measure with the operation of the said clutch or low speed member through the medium of a foot device in case of emergency.

My novel attachment obviates the necessity of the driver holding the clutch or low speed member through the medium of his foot for a considerable period on long hills or in any neutral position as when the machine is coasting, and its novelty, utility and practical advantages will be fully understood from the following description and claims when the same are read in connection with the drawings, accompanying and forming part of this specification, in which:

Fig. 3 is a side elevation, partly in section, of the attachment *per se*, removed.

Fig. 4 is a detail view of the rack bar of the attachment showing the arm at the forward end thereof and the bifurcated terminal on said arm.

Fig. 5 is a detail view illustrative of the preferred manner of fastening the attachment upon a Ford automobile.

Similar numerals of reference designate corresponding parts in all the views of the drawings.

Figure 1:
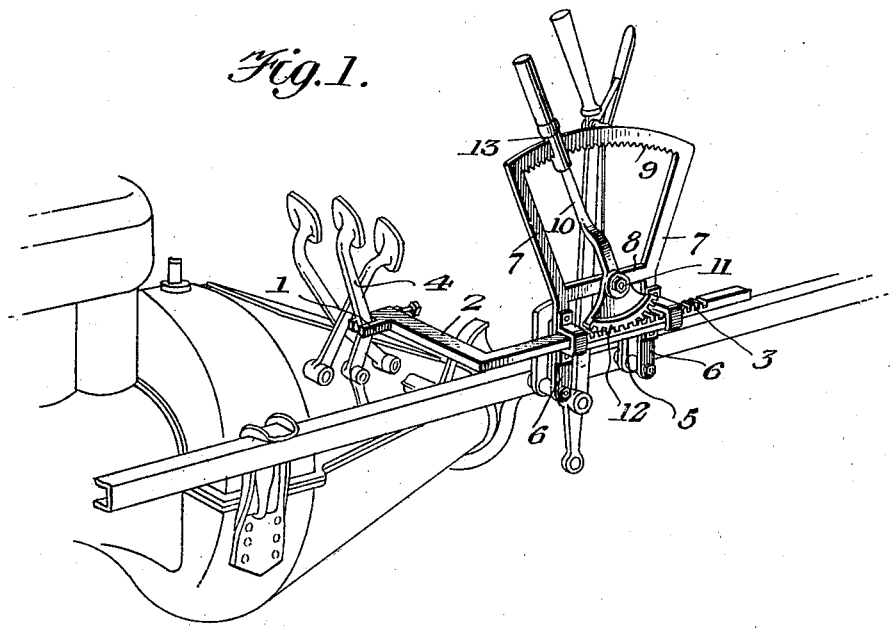
Figure 1 is a perspective showing the arrangement of my novel attachment relative to the well known elements of a Ford car.

By reference to Fig. 1, it will be observed that the bifurcated terminal 1 on the angularly disposed arm 2 of the longitudinally movable rack bar 3 comprised in my attachment is made to straddle from the rear the ordinary clutch or low speed member 4 of a Ford car. By virtue of this arrangement it will be readily appreciated that the application of my improvement will in no measure interfere with the operation of the member 4 through the medium of the ordinary well known foot means illustrated.

In addition to the rack bar 3, my novel attachment comprises a bed-plate 5, and legs 6; the said legs having apertures for the passage of bolts or screws through the medium of which they may be fixedly connected to the body of the Ford car at the left-hand side of the emergency brake.

Fixed to and rising from the bed-plate are uprights 7, connected at an intermediate point by a brace bar 8 and carrying at their upper ends an arcuate rack 9, the teeth of which are disposed at the under side thereof.

My novel attachment also comprises a hand lever 10, fulcrumed at 11 to the bar 8, and equipped at its lower end with a gear sector 12 that is intermeshed with the bar 3. On its upper portion the lever 10 is provided with a detent 13 which is normally held in engagement with the rack 9 through the medium of a housed spring 14 that is interposed between the upper end of the detent and the upper end of the lever 10, as illustrated. Manifestly the driver is enabled after moving the detent 13 downwardly and out of engagement with the rack 9, to move the lever 10 forwardly or rearwardly or to place the same in neutral position as occasion demands. It will also be manifest that when the detent 13 is relieved of pressure, the lever 10 will be adjustably and securely fixed in the position in which it is placed. Forward movement of the lever 10 will throw the gear into high speed, and rearward movement of the lever will bring about low speed.

It will further be appreciated from the foregoing that irrespective of the application of my improvement, the member 4 may be moved forwardly from the bifurcated terminal 1 through the medium of the emergency brake or any other means extraneous to my invention without interference in the slightest degree from my attachment.

Figure 2:
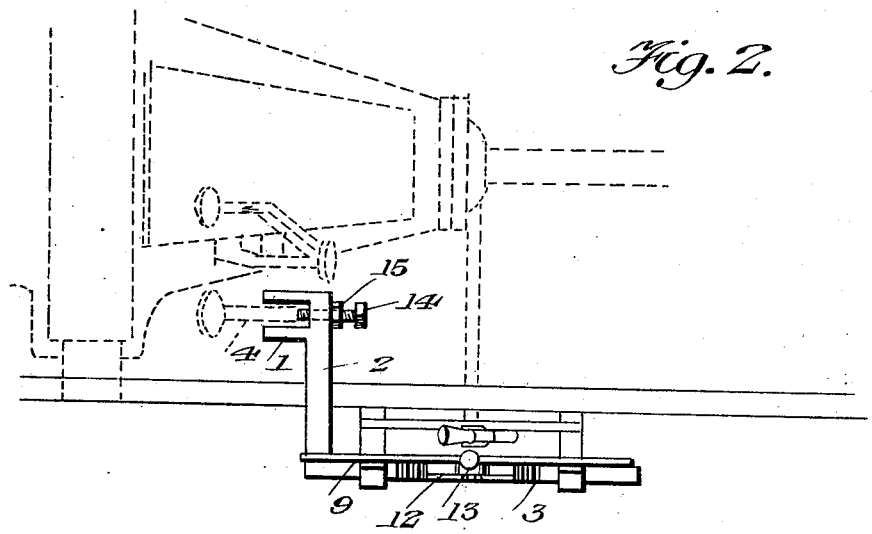
Fig. 2 is a plan view showing particularly the arrangement of the attachment at the left hand side of the emergency brake.

As clearly shown in Figs. 2 and 4, I prefer to provide the bifurcated terminal 1 in the rear portion thereof, with a screw 14 on which is a lock-nut 15. At its forward end, the said screw 14 is designed to bear against the member 4, and by reason of the provision of the screw it will be apparent that the throw of the rack bar may be nicely regulated.

Having described my invention, what I claim and desire to secure by Letters-Patent, is:

1. An attachment for the purpose described comprising a rack bar having an angularly disposed arm and a bifurcated terminal thereon, a suitably supported arcuate rack, a hand lever having a gear intermeshed with the rack bar, and a detent complementary to the arcuate rack and the lever for adjustably fixing the latter with respect to the former.

2. An attachment for the purpose described, comprising a bed-plate having apertured legs, uprights on said bed-plate, an arcuate rack carried by said uprights, a rack bar movable rectilinearly on the bed-plate and having an angular arm, a hand lever fulcrumed on a support between the uprights and having a gear intermeshed with the rack bar, and a spring-pressed detent carried by the hand lever and adapted normally to engage the teeth of the arcuate rack.

3. In an automobile, the combination of a clutch or low speed member, a longitudinally movable rack bar having an arm a portion of which is disposed in rear of said member, said bar being mounted on the automobile body, uprights on the body and carrying an arcuate rack, a hand lever fulcrumed above the rack bar and having a gear intermeshed therewith, and a detent carried by the lever for adjustably fixing the same with respect to the arcuate rack.

4. An attachment for the purpose described, comprising a rack bar having an angularly disposed arm and a bifurcated terminal thereon, an arcuate rack, a hand lever having a gear intermeshed with the rack bar, a detent for adjustably fixing the lever to the arcuate rack, and a screw bearing in the rear portion of the bifurcated portion and adapted to bear forwardly against a member to be adjusted.

In testimony whereof I affix my signature.

RANDOLPH YOUMANS.